July 7, 1970 TADAYUKI GODA 3,519,545
MANUFACTURE OF SUCROSE FROM STARCH HYDROLYSATES USING RADIATION
Filed May 19, 1964 2 Sheets-Sheet 1
FIGURE I
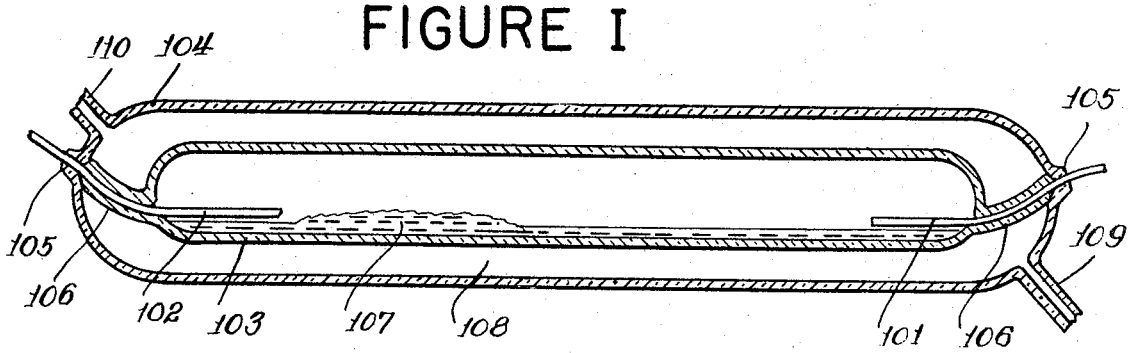
FIGURE II
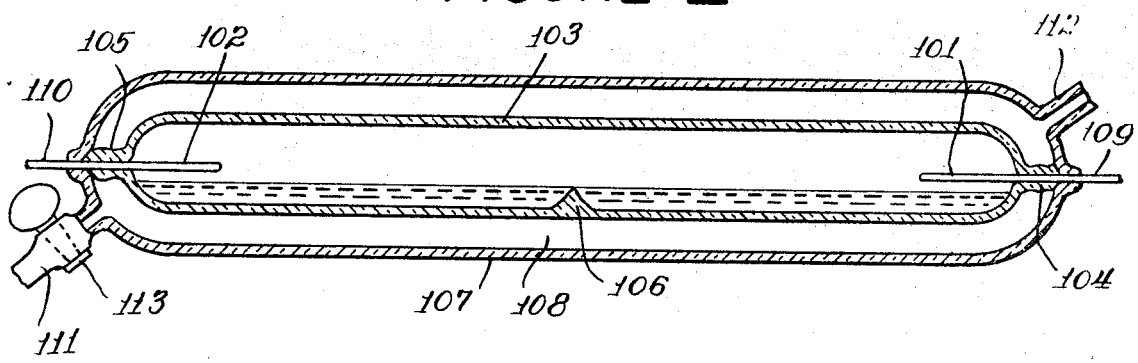
FIGURE III
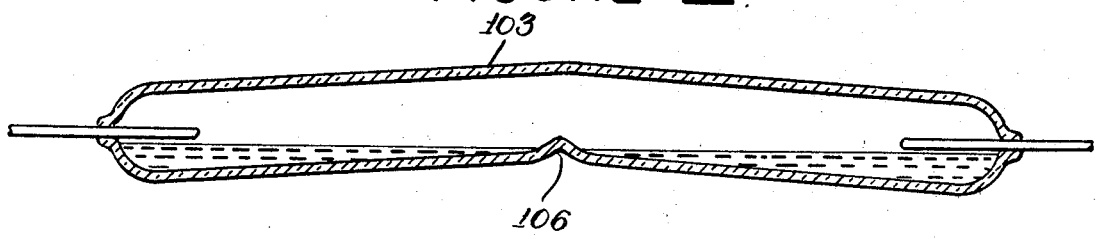
Inventor
Tadayuki Goda
By Mildred Oncken
Att'y.

July 7, 1970
TADAYUKI GODA
3,519,545
MANUFACTURE OF SUCROSE FROM STARCH HYDROLYSATES USING RADIATION
Filed May 19, 1964
2 Sheets-Sheet 2
FIGURE IV
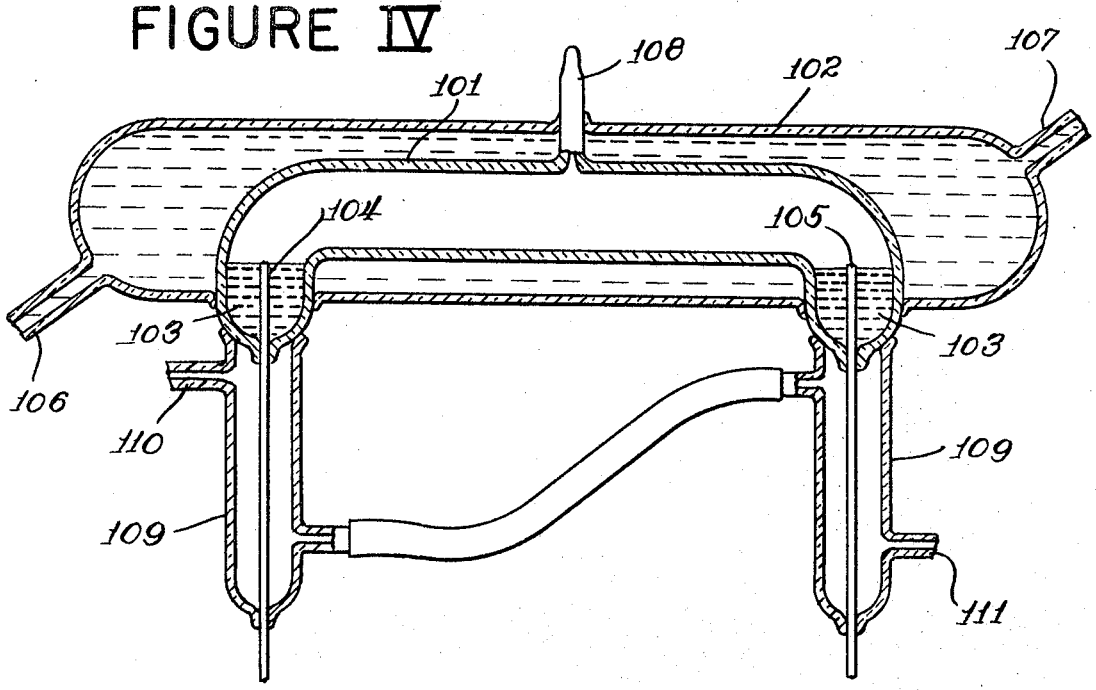
FIGURE V
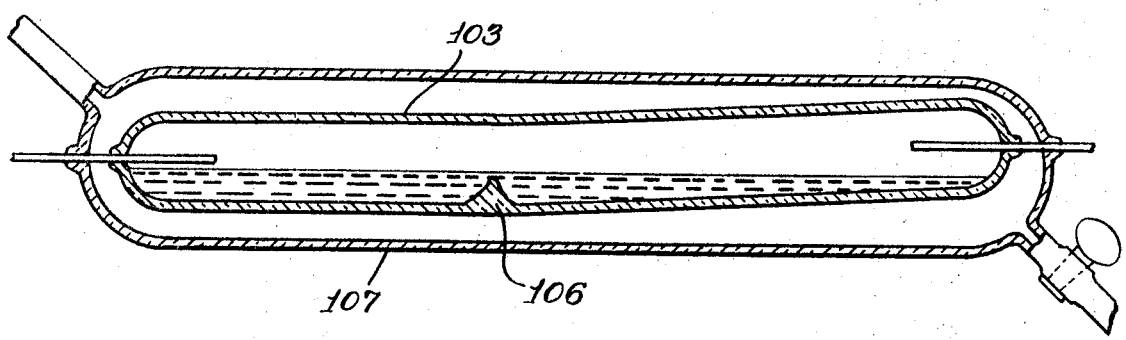
Inventor
Tadayuki Goda
By Mildred Oncken
Atty.

United States Patent Office 3,519,545
Patented July 7, 1970

3,519,545
MANUFACTURE OF SUCROSE FROM STARCH HYDROLYSATES USING RADIATION
Tadayuki Goda, Tokyo, Japan, assignor to Nippon Gosei Kagaku Kabushiki Kaisha, Tokyo, Japan, a company of Japan
Continuation-in-part of application Ser. No. 275,130, Apr. 23, 1963. This application May 19, 1964, Ser. No. 368,626
Int. Cl. B01j 1/10
U.S. Cl. 204—160.1                                                  3 Claims

ABSTRACT OF THE DISCLOSURE

A process for manufacturing sucrose from starch hydrolysates which involves exposing hydrolysate to the rays of two different mercury vapor illumination tubes.

---

This application is a continuation-in-part of application Ser. No. 275,130 filed Apr. 23, 1963.

This invention relates to a new method for producing sucrose from starch hydrolysates and to mercury vapor illumination tubes.

An object of the present invention is to provide a process for producing economically sucrose from hydrolysates of starch which is available in abundance at low cost.

Another object of this invention is to provide a process for producing sucrose having the same chemical and physical properties as the sucrose obtained from natural sources.

Other objects features and advantages of this invention will be apparent from the following descriptions.

The inventor, through long years of research, has succeeded in converting starch hydrolysates into sucrose by treating said hydrolysates with electromagnetic waves in a definite spectral zone generated by and emitted from specially designed sources.

In general, the process comprises subjecting the starch hydrolysate successively to rays emitted from two differently designed sources, i.e., modified mercury vapor tubes or lamps which contain different ray emitting materials.

Although the exact nature of the reaction which takes place during the first and second exposure of the hydrolysate is not known at present, it is believed that certain photo-chemical phenomena occur. It is believed that during the exposure to the first source of rays the energy imparted by the rays to the hydrolysate creates an excited molecular state therein which upon subsequent exposure to the second source of rays forms sucrose molecules.

In the preparation of the hydrolysate, which includes washing and hydrolyzing the starch, the water used may be treated by exposure to the emission from a mercury vapor lamp, as described hereinafter. It is believed that this treatment of the water assists in activating the starch hydrolysate.

Any starch may be used to prepare the hydrolysate by known methods of hydrolysis. However, the preferred method is to hydrolyze the starch using oxalic acid as the catalyst which is subsequently neutralized with calcium carbonate. The degree of hydrolysis may vary considerably, but a D.E. value of at least about 40 to 60 percent is preferred.

The radiant energy generated by the specially designed sources and absorbed by the hydrolysate under treatment will be designated as coming form an "illumination" tube. The term "illumination," as used hereinafter, is intended to refer to the exposure to which the hydrolysate is subjected. The terms "primary illumination" and "secondary illumination," as used herein, are intended to refer to exposure to rays from first and from second illumination tubes, respectively.

As already mentioned, the starch hydrolysate is subjected to rays emitted from specially constructed illumination tubes. These tubes are essentially modified mercury vapor lamps or tubes. The liquid hydrolysate may be treated by either (1) immersing the tube directly in the liquid, or (2) by circulating the liquid contained within an outer jacket around the ray emitting tube.

In carrying out the illumination treatment, various types of tubes constructed along the lines of known mercury vapor tubes or lamps may be used. FIG. I illustrates one type of tube used satisfactorily for both the primary and secondary illumination, the only difference between the two being in the composition of the mercury amalgam in the tubes.

Referring to FIG. I, the numerals 101 and 102 represent the anode and cathode, respectively, which consist of molybdenum-tungsten wire fused to a copper lead wire and a tungsten-nickel wire fused to a copper lead wire, respectively. Other metallic wires suitable to conduct electric current and capable of withstanding the operating temperature of the tube may be used also.

The electric current is conducted to the inner quartz emitting tube 103 by means of an insulating fused connection 105. The electrodes are each encased in a quartz tube 106 to electrically insulate them from the liquid being treated. The inner diameter of the Pyrex jacket 104 is about 48 mm., the wall thickness thereof is about 2 mm. and the length about 40 cm. The quartz tube 103 is made of the most highly purified silicon dioxide available and has a volume of about 360 ml. In preparing the material which emits the rays for the first illumination, at first a mixture of 792 grams of mercury, 20 g. of uranyl nitrate and 5 g. of thorium nitrate is placed in a suitable container and stirred with an electric stirrer for 10 hours at room temperature. After the mixing, a portion of the mixture thus prepared is transferred to a shallow glass tray in which two small glass cups of special design are placed. An anode electrode, which is made of a tungsten-nickel wire fused to a copper lead wire, is attached to the upper part of the cup while the cathode electrode is likewise put through another cup. The electrolysis takes place with 100 volts and 1 ampere electrical load for 21.5 hours at about 22.5 to 23.7° C. After the electrolysis the cathode electrode is put through a glass cup of different type attached with syringe while leaving the anode as it is. The second electrolysis continues for 4 hours at 24° to 26° C. with the electrical load of 12 volts and 1 ampere. Using the syringe, about 47 g. of the material which is collected near the cathode is taken out. 38 g. out of 47 g. of thus separated material is put into a distillation chamber to which 630 g. of pure mercury is further added to fill up the pipe connected to the inner quartz tube 103. Then the distillation is carried out at 128° to 130° C. under vacuum of $10^{-6}$ mm. Hg until about 220 to 230 g. of the distillate are contained inside of the quartz tube, as indicated by the numeral 107. Air is evacuated from the tube 103 and then it is hermetically sealed.

The material used for the second illumination is prepared from a mixture consisting of 1,000 g. of mercury, 25 g. of uranyl nitrate, and 25 g. of thorium nitrate and the mixture is then electrolyzed, separated and distilled in a similar manner as for the first illumination tube.

In order to provide a space 108 in which the liquid hydrolysate undergoing treatment may directly contact the quartz tube 103, this tube, as already mentioned, is housed in a Pyrex tube 104 which has attached an inlet tube 109 and an outlet tube 110 to conduct liquid being illuminated.

When the illumination tubes are in operation the electrical load will show 100 volts and from 2.8 to 3.4 amperes.

FIG. II illustrates another type of tube which may be used both for the primary and secondary illumination. Referring to FIG. II, both the positive and negative electrodes 101 and 102 are passed through and fused to the inner tube 103, as indicated. Tube 103 is made of highly purified quartz. The anode 101 consists of a plate of molybdenum atached to a tungsten wire which in turn is attached to a copper lead wire 104. The cathode 102 consists of a tungsten-nickel wire fused to a copper lead wire 105. A small dam or barrier 106 in the tube 103 permits placing the amalgam either at the cathode or anode, and to prevent the amalgam from shorting the cathode and anode. For the primary illumination treatment, the inner quartz tube 103 is charged with about 200 to 220 g. of the distillate which is prepared by mixing 1,000 g. mercury, 10 g. of thorium nitrate and 10 g. of uranyl nitrate and then by electrolyzing, separating and distillating the mixture under vacuum of about $10^{-6}$ mm. Hg at a temperature of about 128° C. The air is evacuated from the quartz tube 103 and it is then hermetically sealed.

FIG. III shows a slight elevation in tube 103 which together with the small dam or barrier 106 permits placing the amalgam at either the anode or cathode and to prevent the amalgam from shorting the anode and cathode.

Referring again to FIG. II, the inner or quartz tube 103 is encased in an outer tube 107 made of Pyrex glass in order to provide the annular space 108 for treatment of the liquid. The electrodes connected to lead wires 104 and 105 are passed through the outer tube 107, and electrically insulated from the liquid by quartz tubes 109 and 110, and connected to a source of electric current. To the outer tube 107 are attached two small tubes 111 and 112 for incoming and outgoing streams, respectively, of liquid to be illuminated. The rate of flow of the liquid in the outer tube 107 may be regulated, by means of a known regulating device 113. When the illumination tube is in use, liquid enters at 111 and leaves at 112. In order to effect continuous circulation of the liquid, it is fed from a supply tank, not shown, into the tube 107 at 112, and after leaving the tube 107 at 111, it is returned to the supply tank. The supply tank may be heated by a water bath to maintain the desired temperature of the liquid.

FIG. IV represents an illumination device wherein both the inner and outer tubes are made of the most highly purified quartz available. The numeral 101 represents the inner tube which has diameter of about 2.5 cm. and a length of about 25 cm. This is encased in outer tube 102 which has a diameter of about 7.5 cm. and length of about 30 cm.

When this type of tube design is used for the secondary illumination, the inner tube 101 is charged as shown at 103 with about 350 to 360 g. of the distillate which is prepared by mixing 1,000 g. of mercury, 50 g. of thorium nitrate and 50 g. of uranyl nitrate and then by electrolyzing, separating and distillating the mixture under vacuum of about $10^{-6}$ mm. Hg at a temperature of about 128° C. The tube 101 is charged with the distallate through side arm 108 projecting through outer tube 102. The air is evacuated from the tube 101 and the side arm 108 is hermetically sealed.

The electrodes 104 and 105 may be cooled by means of small individual condensers 109, surrounding each electrode, through which cooling water may be passed, entering at 110 and leaving at 111. The electrodes are insulated in quartz to protect them from the liquid being treated.

The anode and cathode are constructed, as shown in FIG. II, and constructed of the same materials described in connection therewith. The liquid being illuminated enters tube 102 at 106 and leaves at 107. During illumination the electrical load will show 100 volts and from 3.0 to 3.4 amperes.

FIG. V shows another construction for the illumination tube. This tube is substantially identical to that shown in FIG. II, except that half of the inner tube 103 nearest the anode is centered in the outer jacket 107, but the other half rises upwardly so that the upper annulus is smaller than the lower. As in FIG. II, a small dam or barrier 106 is placed at the bottom of inner tube 103 to permit placing the amalgam on one side or the other as desired.

The device used to treat or activate the water consists of a known type of Y shaped tube with the base of the Y being the cathode and the other two branches being the anode. The anode is made of tungsten-nickel wire and the cathode of tungsten-molybdenum wire. The tube is of a size to be charged with 215 g. of mercury. It is operated at 100 volts (A.C.) and 4.5 amperes and is immersed in the water for the activation treatment. Generally, the treatment is carried out at the rate of 3 to 5 hours for 60 liters of water.

The invention will be further illustrated by examples which are intended as typical and informative only and in no way limiting the invention.

EXAMPLE 1

Five hundred (500) grams of commercial corn starch was mixed with activated water and allowed to stand for about 12 hours. The water had been activated by the method heretofore described at the rate of 3 hours for each 2 liters. The starch was filtered and the cake was washed 3 times with 2 liters of activated water each time.

To the washed starch cake was added sufficient activated water to make a total weight of 2410 g. To this slurry was added 3 g. of oxalic acid dihydrate. The start slurry was hydrolyzed in an autoclave. Fifty-one (51) minutes were required to raise the temperature to 102° C. which was maintained for 71 minutes. Thereafter the temperature was increased to 128° C. in 24 minutes and maintained for 82 minutes. The liquid was cooled to 100° C. in 128 minutes. The degree of hydrolysis was not satisfactory so the hydrolysate was then heated to 128° C. in 40 minutes, this temperature being maintained for 5 minutes. Then the final hydrolysate was cooled to 100° C. in 128 minutes. It was filtered to remove insoluble impurities. To the filtrate was added 4.8 g. of calcium carbonate. Then 3 g. of decolorizing carbon and 2 g. of filter aid (Cellite) were added and the liquor filtered again. The dextrose equivalent (D.E.) of the final hydrolysate was 62 percent.

The hydrolysate was charged to the first illumination tube described hereinabove in connection with FIG. I. It was exposed to illumination from the quartz tube by being circulated around the quartz tube, i.e., the hydrolysate was in direct contact with the quartz tube, at the rate of 1760 ml. per minute. The temperature of the hydrolysate being circulated was maintained at 41–42° C. and the circulation or exposure to illumination was continued for 5 hours and 50 minutes. The voltage used was 100 and the amperage going through the tube was 3.4 at the start and 3.0 at the end of the treatment.

The liquid was intrduced immediately into the second illumination tube, which is the same in design as the first as shown in FIG. I, but with different amalgam, as previously described. The liquid was recirculated through the Pyrex jacket in contact with the quartz tube at the rate of 1760 ml. per minute for 3 hours and 45 minutes while the temperature was maintained at 45–47° C. To the liquid was added 3 g. of carbon and 2 g. of filter aid (Cellite) and then it was filtered. 1670 milliliters of the filtrate was concentrated under vacuum using a water bath at 50° C., 0.5 g. of sucrose was added as seed and crystalline sucrose was obtained.

Examples 2, 3, 4, 5 and 6 were carried out in substantially the same manner as Example 1. The various amounts of materials, conditions used, and results obtained, including those for Example 1, are set forth in Table I.

The product was identified as sucrose by (1) change in rotation and reducing value before and after acid inversion, as well as before and after inversion with invertase; (2) by a microscopic comparison of crystal structure with crystals of sucrose obtained from natural sources; (3) by the melting point of the recrystallized product and by a mixed melting point of the recrystallized product with pure sucrose; (4) by comparison of the R.F. (Relative Flow) value upon paper strip chromotography with that of pure sucrose; (5) by a comparison of the R.F. values of the dextrose and levulose obtained after hydrolysis with invertase; and (6) by X-ray diffraction patterns.

scribed in Example 7. The time of the first illumination treatment was 5 hours and the temperature of the hydrolysate at the beginning was 34° C., but after the first half-hour, it was maintained at 45 to 47° C. The voltage used was 100 and the amperage was 3.0 to 3.2.

The hydrolysate after the first illumination treatment was transferred immediately to the second illumination tube.

The duration of the second illumination treatment was 3 hours and the temperature of the liquid was maintained at 44 to 48.5° C. The voltage used was 100 and the amperage 3.4 to 3.5.

TABLE I

| Ex. No. | Total corn starch, g. | Oxalic acid, percent by weight of starch | Conversion time, minutes 102° C. | Conversion time, minutes 128° C. | D.E. $CaCO_3$ per g. oxalic acid | D.E. neutralized liquor, percent | D.S. neutralized liquor, percent | pH after 2nd tube | First tube, hrs. | Second tube, hrs. | Sucrose, percent d.b. | Ash in sucrose, percent d.b. | P.p.m. Ca |
|---|---|---|---|---|---|---|---|---|---|---|---|---|---|
| 1 | 500 | 0.6 | 77 | 87 | 1.6 | 62 | 17.8 | 5.0 | 6 | 4.5 | 49 | 0.14 | 203 |
| 2 | 500 | 0.6 | 75 | 87 | 1.6 | 53 | | 4.1 | 6 | 4.5 | 14 | 6.19 | 327 |
| 3 | 500 | 0.6 | 75 | 87 | 1.5 | 52 | 17.7 | | 5 | 3 | 80 | 0.10 | 108 |
| 4 | 650 | 1.0 | 75 | 87 | 1.7 | 74 | 19.0 | 4.4 | 5.3 | 4.5 | 14 | 0.23 | 457 |
| 5 | 500 | 0.6 | | 87 | 1.5 | | | | 5 | 3 | 80 | 0.06 | |
| 6 | 500 | 0.6 | 102 | 82 | 1.5 | | | | 5 | 3 | 80 | | |

EXAMPLE 7

Corn starch (820 g.; 500 g. (commercial basis)) which had been slurried in and washed 3 times with activated water was slurried in 1600 cc. of activated water containing 3 g. of oxalic acid dihydrate. The slurry was placed in an autoclave and hydrolyzed for a period of about 6 hours. The temperature and pressure were gradually increased during a period of about 2 hours and 45 minutes to 128° C. and 2.0 kg./cm.$^2$. Thereafter the temperature was maintained at 128° C. and the pressure increased to about 2.3 kg./cm.$^2$ and maintained thereat for about 1 hour and 45 minutes. The temperature and pressure were then decreased to about 100° C. and 1.0 kg./cm.$^2$. The pH of the hydrolysate was adjusted to 5.4 with 4.8 g. of calcium carbonate, the hydrolysate was filtered and refined, as described in Example 1. The refined hydrolysate (2170 cc.) was subjected to illumination in an illumination tube, as described in FIG. I. The rate of flow was 1.8 liters per minute. The temperature of the liquid as it was recirculated was maintained at 40 to 49° C. and the duration of the illumination treatment was 5 hours. The voltage used was 100 and the amperage 3.0 to 3.25.

After the first illumination treatment was completed, the liquor was transferred immediately to another tube for the second illumination treatment. The tube used was the same as that described in connection with FIG. IV. The illumination was carried out for 3 hours at a flow rate of 1.8 liters per minute while the temperature of the liquid was maintained at 46 to 51° C. The voltage used was 100 and the amperage 3.2 to 3.3.

After the liquid was concentrated for 9 hours under vacuum using a water bath at 50° C., the concentrate was seeded with sucrose. The amount of sucrose obtained was 320 g.

EXAMPLE 8

Sweet potato starch (790 g.; 500 g. (commercial basis)) which had been slurried in and washed 3 times with activated water was slurried in 1500 cc. of activated water containing 2.5 g. of oxalic acid dihydrate. The slurry was placed in an autoclave and hydrolyzed for a period of about 5 hours. The temperature and pressure were gradually increased during a period of about 2 hours to 128° C. and 2.0 kg./cm.$^2$. Thereafter the temperature was maintained at about 128° C. and the pressure increased to about 2.3 and maintained thereat for an hour and 30 minutes. The temperature and pressure were then decreased to about 100° C. and 1.0 kg./cm.$^2$, respectively, in about 1 hour and 30 minutes. The pH of the hydrolysate was adjusted to 5.4 with 4.2 g. of calcium carbonate, the hydrolysate was filtered and refined, as described in Example 1. The refined hydrolysate (1890 cc.) was illuminated, as de- The liquid was concentrated, as described in Example 7, and the amount of sucrose obtained was 690 g.

EXAMPLE 9

Tapioca starch (810 g.; 500 g. (commercial basis)) which had been slurried in and washed 3 times with activated water was slurried in 1500 cc. of activated water containing 2.5 g. oxalic acid dihydrate. After the temperature had been raised to 128° C. and the pressure to 2.0 kg./cm.$^2$ as described in previous examples, it was maintained thereat for 69 minutes. Thereafter the pressure was gradually increased to 2.3 and then allowed to drop to 1.0 and the temperature decreased to 100° C. The total time of the hydrolysis was about 5 hours and 45 minutes. The pH of the hydrolysate was adjusted to 5.4 with 4 g. of calcium carbonate, the hydrolysate was filtered and refined, as described in Example 7. The refined hydrolysate (1770 cc.) was subjected to illumination, as described in Example 7. The temperature of the liquor at the beginning of the first illumination was 37.5° C., but after the first half-hour, it was raised to 45.5° C. and maintained within the range of 45.5 to 47° C. for the remainder of the 5-hour period of illumination. The voltage used was 100 and the amperage 3.2 to 3.5. The second illumination was carried out for 3 hours at a temperature of 42 to 49.5° C. The voltage used was 100 and the amperage 3.3 to 3.4.

After the liquid was concentrated, as described in Example 7, a substantial yield of sucrose was obtained. However, the exact weight of the sucrose crystals obtained was not determined in this run.

EXAMPLE 10

To 500 g. of commercial sweet potato starch was added 2 liters of pure water and, after stirring the mixture, was allowed to stand 12 hours. It was then filtered, and the filter cake washed 3 times with pure water. The washed starch cake which weighed 810 g. was slurried in 1.6 liters of pure water, containing 2.5 g. of oxalic acid. The slurry was placed in an autoclave and the starch was liquified by heating with constant stirring. This was followed by hydrolysis at the pressure of 2.5 kg./cm.$^2$ at 128° C. for about 75 minutes. Thereafter, the hydrolysate was cooled and neutralized with 4 g. of calcium carbonate to a pH of 5.4, treated with activated carbon and after the addition of filter-aid, was filtered. 1980 cubic centimeters of clear hydrolysate was obtained.

The liquid was transferred to a supply tank which was maintained at the desired temperature by means of a water bath. The liquid was pumped at the rate of 1.8 liters per minute from the supply tank into the jacket of the first illumination tube, as illustrated in FIG. II, and returned to the supply tank and circulated in this manner for a period of 5 hours. The temperature of the hydrolysate was maintained at 41 to 43° C. during the illumination treatment. The tube was operated at 100 volts and 3.1 to 3.4 amperes.

Immediately after the completion of the first illumination treatment, the hydrolysate was transferred to a second illumination tube as illustrated by FIG. V. The flow rate was 1.8 liters per minute and the temperature of the hydrolysate during the illumination treatment was maintained at 45 to 48° C. The tube was operated at 100 volts and 3.8 to 3.9 amperes. After completion of the second illumination treatment, the hydrolysate was transferred to an apparatus where it was concentrated under vacuum at about 50° C. As the concentration proceeded, crystallization of sucrose took place. Towards the end of the concentration period about 0.5 g. of crystalline sucrose was added to accelerate the crystallization. A yield of 85 percent of sucrose, on a dry substance basis, was obtained. The product was characterized as sucrose by means of X-ray diffraction.

The amalgam used in the first illumination tube was prepared by mixing 100 parts of mercury, 2.5 parts of uranyl nitrate and 0.6 part of thorium nitrate and then by electrolyzing, separating and distillating the mixture, as described heretofore.

The amalgam used in the second illumination tube was prepared by mixing 100 parts of mercury, 2.5 parts of uranyl nitrate and 2.5 parts of thorium nitrate and then by electrolyzing, separating and distillating the mixture in the similar manner described hereinabove.

What I claim is:

1. A process for producing sucrose from starch hydrolysate which comprises exposing said hydrolysate successively to the rays generated by passing electric current through a primary and secondary mercury vapor illumination tube; said primary illumination tube consisting of pure silicone dioxide and having sealed therein electrodes and a first mercury amalgam composition, said first composition being prepared by forming a mixture of 1,000 parts by weight of mercury, 10 to about 25 parts by weight of uranyl nitrate and 5 to 10 parts by weight of thorium nitrate and electrolyzing, separating, and distilling said mixture; said secondary illumination tube consisting of pure silicone dioxide and having sealed therein electrodes and a second mercury amalgam composition, said second composition being prepared by forming a mixture of 1,000 parts by weight of mercury, 25 to 50 parts by weight of uranyl nitrate, and 25 to 50 parts by weight of thorium nitrate and electrolyzing, separating, and distilling said mixture.

2. A process as defined by claim 1 wherein said starch hydrolysate is prepared using water which has been exposed to the rays of a mercury vapor lamp.

3. A process as defined by claim 1 wherein subsequent to the exposure to said primary and secondary mercury vapor illuminations, the starch hydrolysate is concentrated and sucrose recovered therefrom.

No references cited.

MURRAY TILLMAN, Primary Examiner

R. B. TURER, Assistant Examiner

U.S. Cl. X.R.

260—233.3